May 21, 1940.                    H. CARLSON                    2,201,474
                        LOADING DEVICE FOR SCANNING DRUMS
                    Original Filed April 8, 1932      2 Sheets-Sheet 1
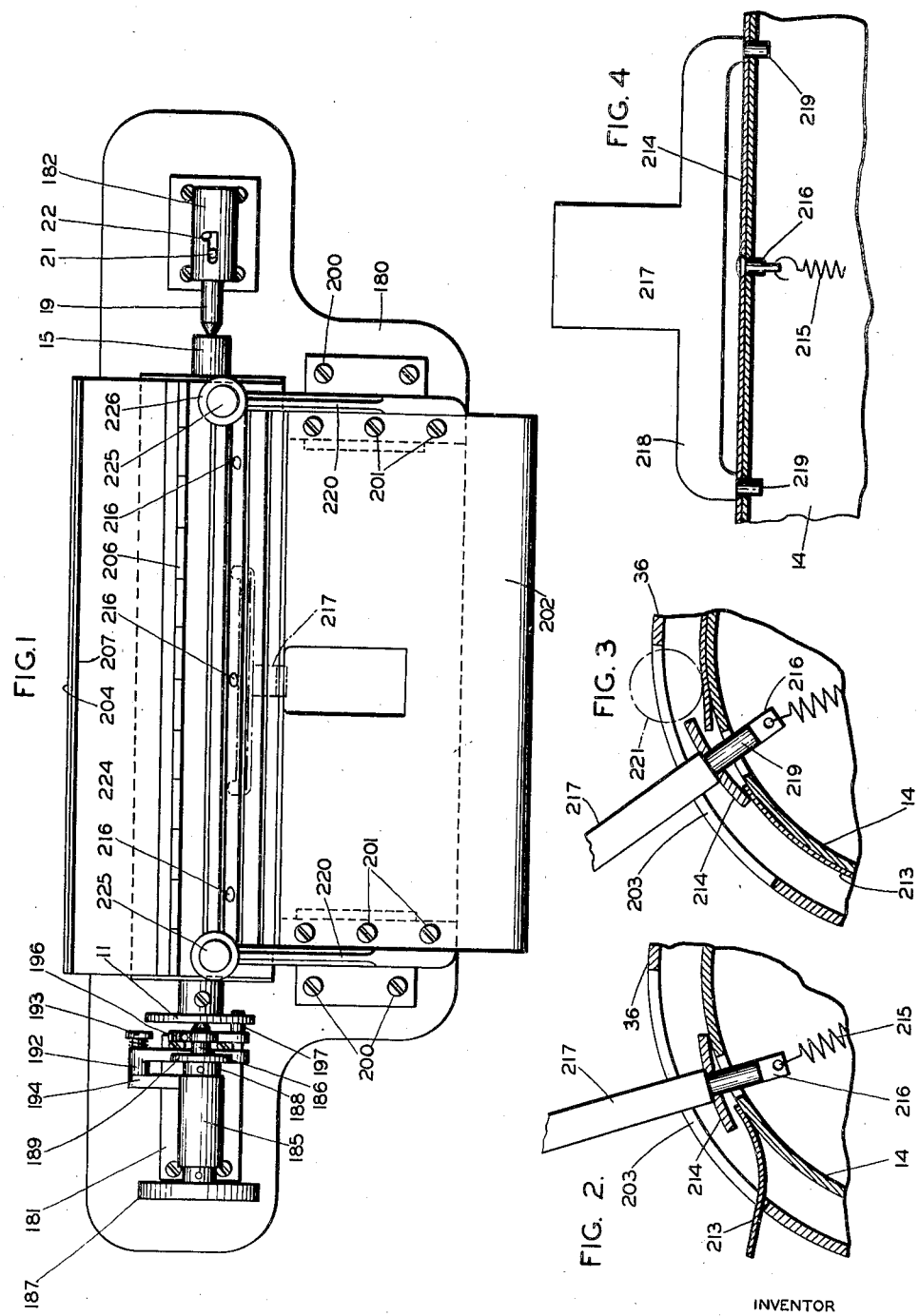
INVENTOR
HAROLD CARLSON
BY James N. Curtin
ATTORNEY

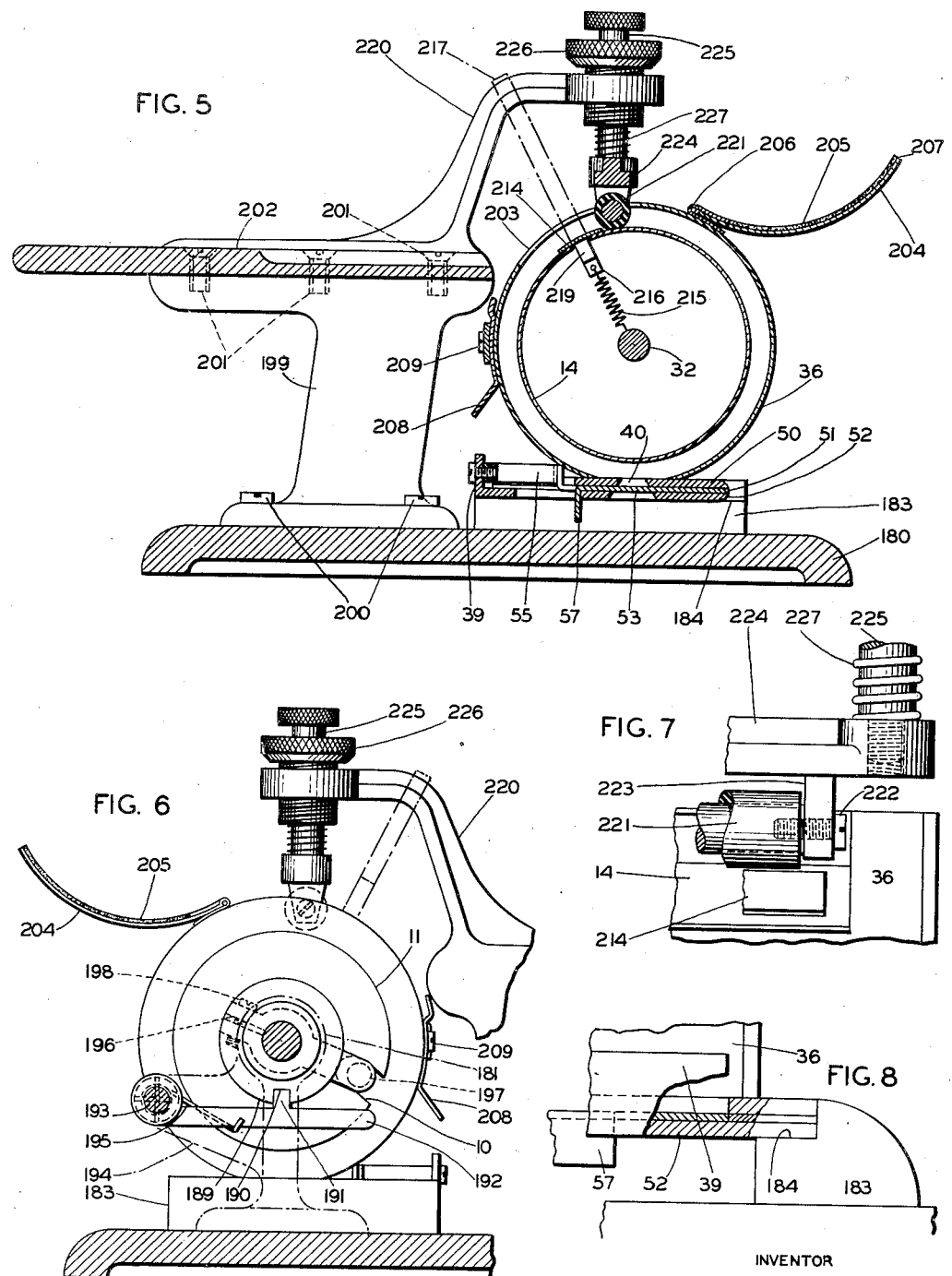

Patented May 21, 1940

2,201,474

UNITED STATES PATENT OFFICE 2,201,474

LOADING DEVICE FOR SCANNING DRUMS

Harold Carlson, White Plains, N. Y., assignor to The Associated Press, New York, N. Y., a corporation of New York Original application April 8, 1938, Serial No. 200,895. Divided and this application February 25, 1939, Serial No. 258,402

15 Claims. (Cl. 178—6.7)

This application is a division of application Ser. No. 200,895, filed April 8, 1938.

This invention relates to a loading device for picture scanning drums.

An object of the invention is the provision of a device by which film may be removed quickly from detachable picture scanning drums and replaced by unexposed film with a minimum of handling of the sensitized material.

Other objects will appear in the following description given with the aid of the accompanying drawings, of which Figure 1 is a plan view of one modification of the present invention;

Figures 2 and 3 illustrate the operation of the mechanism by which a sensitized sheet is secured to a scanning drum;

Figure 4 shows a tool for operating the film holding strip on the scanning drum;

Figure 5 is a section taken through the center of Figure 1;

Figure 6 is a section taken through sleeve 188 of Figure 1;

Figure 7 is a detailed view of the pressure roller mounting;

Figure 8 is a sectional showing of the drum and the guideway therefor in the loading device.

The present invention contemplates a scanning drum 14 which is enclosed in a light proof casing 36, the latter being provided with a base 39, Figures 5 and 8, composed of three strips of metal, 50, 51 and 52 secured to each other and also to casing 36. The metal strip 51, however, is cut away for some distance beyond a slot 40 in the base of casing 36 on three sides, and the fourth side which will overlie a corresponding slot in the base of the receiving machine, not shown, is completely cut away for a distance somewhat greater than the length of slot 40 which provides a recess between strips 50 and 52 into which slides a shutter 53 which when closed renders light proof the part of the casing just referred to. A curved spring 55 secured to the base provides a yielding means for holding the shutter closed. The shutter, scanning drum and casing are fully described in co-pending application, Ser. No. 258,401, filed Feb. 25, 1939.

When in use, the base of the casing is held by a suitable support, and the drum shaft 15 which extends through light tight openings in casing 36 is rotatably supported between suitable centers, not shown, so that it may turn free of the casing, the sensitized material 213, Figure 2, carried by the drum being exposed by a scanning light projected from a suitable optical system through slot 40 in the base of casing 36.

The present invention discloses a mechanism by which sensitized sheets may be quickly replaced on the scanning drum with a minimum of handling. The device consists of a base 180 provided with a head stock 181 and a tailstock 182, the latter being provided with a spring plunger 19 which may be locked in retracted position by means of pin 21 which is free to travel in an L-shaped slot 22.

Two strips 183 are disposed on the base to form a support and guideway for base 39 of the cylinder casing. Strips 183 have lengthwise recesses 184 made in the top surfaces thereof to form guides for the ends of base 39, the guides supporting the base at a height sufficient for the depending shutter actuating pieces 57 to clear base 180, so as not to open the shutter when the cylinder casing is inserted into the guideways. The head and tail stocks are of the proper height to engage the centers on shaft 15 and disc 11 which support cylinder 14 so that the latter may be turned free of the casing.

The head stock consists of a bracket 185 through which extends shaft 186, at one end of which is a knob 187 and near the opposite end, adjacent to the bracket, is secured a sleeve 188 integral with disc 189 having a square notch 190 cut in its periphery. This notch cooperates with tooth 191 on the upper edge of lever 192 pivoted on screw 193 supported by bracket 194 which is part of head stock bracket 185. Spring 195 presses lever 192 upward against disc 189.

Beyond disc 189 is secured an arm 196 carrying a pin 197 projecting therefrom parallel with shaft 186. Clamping screw 198 permits arm 196 to be locked to shaft 186 in the desired angular position. Pin 197 is adapted to fit into slot 10 of disc 11 on drum shaft 15 to form a connection between knob 187 and the drum, permitting the latter to be rotated by the knob.

Figure 6 shows the cylinder and knob 187 locked against rotation by tooth 191 on lever 192 which is shown positioned in notch 190 in disc 189. The parts may be freed for rotation by pressing downward on lever 192 which disengages the tooth and notch and if the disc is rotated a trifle and thereafter the lever is released, one complete turn of the cylinder may be made before the lever locks the cylinder again. This mechanism is used for the purpose of positioning automatically a film retaining clip 214 on the cylinder in respect to a loading platform which will now be described.

Located adjacent to guide strips 183 is a pair of brackets 199 secured to base 180 by screws 200. Between the brackets, and secured by screws 201 to steps formed thereon is a shelf or loading platform 202. The upper part of casing 36 has a longitudinal opening extending the length of cylinder 14 which lines up with platform 202 when the drum is positioned in the loading device. The opening is provided with a curved, light proof cover 204 lined with felt 205 and hinged to the casing by hinge 206. The cover overlaps opening 203 and edge 207 is retained when the cover is closed by lock 208. The lock is formed of a metal strip attached to casing 36 by shoulder screw 209 which extends through an elongated hole in the piece 208 permitting a limited sliding movement of the strip.

Sensitized sheet 213 is held in place on the drum by retaining strip 214 which extends the length of the drum. The retaining strip is held in place by means of springs 215 fastened between shaft 32 and studs 216 secured to strip 214.

A loading tool 217 having bifurcated arms 218 which carry pins 219 that fit openings on the retaining strip is used to tilt the strip sideways in either direction, Figures 2 and 3, for the purpose of removing or inserting film. The edge of the retaining strip may be serrated if desired to prevent the film from slipping.

Extension brackets 220 are formed integrally with brackets 199 but are slightly offset therefrom so as to extend upward along the edges of the loading table 202 to form a guide for the edges of the film and to support a pressure roller 221.

Roller 221 is rotatably supported by screws 222 which extend through lugs 223 depending from cross-bar 224, the ends of which are yieldingly held by vertical rods 225 which pass through hollow adjusting screws 226 which are threaded into brackets 220.

Roller 221 is located so that it engages the surface of drum 14 parallel with shaft 32, and arm 196 is adjusted so that the retaining strip 214 just clears roller 221 during a film changing operation. Springs 227 press roller 221 against the cylinder surface, and this pressure may be varied by adjusting screws 226.

The invention operates as follows: Assume that the casing is properly positioned in the loading device with the drum shaft supported between the centers thereof. Then the upper edge of the retaining strip may be raised as shown in Figure 3 releasing one edge of the film, and thereafter tool 217 is withdrawn and the film is ejected from the casing by turning knob 187 so that drum 14 is turned in a counterclockwise direction until strip 214 again reappears. The opposite edge of the film may now be released from the retaining strip.

The drum automatically locks against rotation with the retaining strip properly positioned in respect to loading table 202 for the loading operation. The new film is guided between members 220 at the edges of the loading table, and one edge is inserted under retaining strip 214 as shown in Figure 2. The drum is then turned in a clockwise direction, and roller 221 presses the film evenly against the drum's surface until the position shown in Figure 3 is reached when the strip 214 is sprung from under the film and tilted and released so as to overlie and retain the edge of the film. Tool 217 is then removed and the cover 204 closed and the drum is ready for another exposure operation.

What is claimed is:

1. In a film loading device for detachable scanning drums enclosed in light proof casings, a guideway for supporting a casing, means for supporting a drum so it may turn clear of the casing comprising a headstock and a tailstock located respectively on opposite sides of said guideway, manual means effective through said headstock for rotating the drum in its supports, and means associated with one of said drum supports adapted to arrest the rotary movement of the drum at the end of each revolution.

2. In a film loading device for detachable scanning drums enclosed in light proof casings, a guideway for supporting a casing, means for supporting a drum so it may turn clear of the casing when the latter is positioned in the guideway comprising a headstock and a tailstock located respectively on opposite sides of said guideway, manual means effective through said headstock for rotating the drum in its supports, a stop device associated with one of said drum supports adapted to arrest the rotary movement of the drum at the end of each revolution, and manually operated means for disengaging said stop device.

3. In a film loading device for detachable scanning drums enclosed in light proof casings, wherein the drum is provided with a longitudinal clamping strip, and the casing with an aperture for the insertion of film, a guideway for supporting a casing, means for supporting a drum so it may turn clear of the casing when the latter is positioned in the guideway comprising a headstock and a tailstock located respectively on opposite sides of said guideway, manual means effective through said headstock for rotating the drum in its supports, a stop device associated with one of said drum supports adapted to arrest the rotary movement of the drum at the end of each revolution, and means for detachably securing said drum to said headstock so that said stop device is effective when the clamping strip is in alignment with the aperture in the casing.

4. In a film loading device for detachable scanning drums enclosed in light proof casings, wherein the drum is provided with a longitudinal clamping strip, and the casing with an aperture for the insertion of film, a guideway for supporting a casing, means for supporting a drum so it may turn clear of the casing when the latter is positioned in the guideway comprising a headstock and a tailsock located respectively on opposite sides of said guideway, manual means effective through said headstock for rotating the drum in its supports, a stop device associated with said headstock adapted to arrest the rotary movement thereof once each revolution and means for setting said stop device to become effective at some predetermined angular position.

5. In a film loading device for detachable scanning drums enclosed in light proof casings, wherein the drum is provided with a longitudinal clamping strip, and the casing with an aperture for the insertion of the film, a base, a guideway thereon for supporting a casing, means for supporting a drum so it may turn clear of the casing when the latter is positioned in the guideway comprising a headstock and a tailstock located respectively on opposite sides of said guideway, means for detachably securing the drum to said headstock in a predetermined axial position, manual means effective through said headstock for rotating the drum in its supports, a stop device associated with said headstock adapted to arrest the rotary movement thereof once each revolution, said stop device being effective when the clamping strip is in alignment with the aperture in the casing.

6. In a film loading device for detachable scanning drums enclosed in light proof casings, wherein the drum is provided with a longitudinal clamping strip, and the casing with an aperture for the insertion of film, a base, a guideway thereon for supporting a casing, means for supporting a drum so that it may turn clear of the casing when the latter is positioned in the guideway comprising a headstock and a tailstock located respectively on opposite sides of said guideway, means for detachably securing the drum to said headstock in a predetermined axial position, manual means effective through said headstock for rotating the drum in its supports, a stop device associated with said headstock adapted to arrest the rotary movement thereof once each revolution, said stop device being effective when the clamping strip is in alignment with the aperture in the casing, and a loading platform on said base for holding film in alignment with the aperture in the casing.

7. In a film loading device for detachable scanning drums enclosed in light proof casings, wherein the drum is provided with a clamping strip, and the casing with an aperture for the insertion of film, a base, a platform on said base for holding film in alignment with the aperture in the casing, pressure roller means supported by said base adapted to enter said aperture and press the film against the surface of the drum during the loading operation, means for supporting a drum so it may turn clear of its casing when the latter is positioned in the guideway, said means comprising a headstock and a tailstock positioned on opposite sides of said guideway, means for detachably securing the drum to the headstock in a predetermined axial position, a knob on said headstock for rotating the drum, a detent device associated with the headstock adapted to arrest the rotary movement thereof when said clamping strip is in alignment with the aperture in the casing, and a pivoted lever supported by said base for disengaging said detent.

8. In a film loading device for detachable scanning drums enclosed in light proof casings, wherein the drum is provided with a clamping strip, and the casing with an aperture for the insertion of film, a base, a platform on said base for holding film in alignment with the aperture in the casing, pressure roller means supported by said base adapted to enter said aperture and press the film against the surface of the drum during the loading operation, a headstock and a tailstock positioned on opposite sides of said guideway for supporting the drum so that it may turn clear of its casing, means for detachably securing the drum to the headstock in a predetermined axial position, a notched disc secured to said headstock and adapted to turn therewith, a spring pressed tooth adapted to engage the edge of said disc and enter said notch, and a manually operated member for disengaging said tooth and said notch.

9. In a device for changing film on a detachable scanning drum while the drum is enclosed in a normally light proof casing provided with a film changing aperture, means for temporarily supporting said casing, means for supporting said drum, and manually operated means for turning said drum in said casing.

10. In a device for changing film on a detachable scanning drum while the drum is enclosed in a normally light proof casing provided with a film changing aperture, means for temporarily supporting said casing, means for supporting said drum, means for attaching said drum to said supporting means in a predetermined angular position, and manually operated means for turning said drum in said casing.

11. In a device for changing film on a detachable scanning drum while the drum is enclosed in a normally light proof casing provided with a film changing aperture, a guideway for temporarily supporting said casing, means for supporting said drum so that it may turn clear of said casing, and manually operated means for turning said drum.

12. In a device for changing film on a detachable scanning drum while enclosed in a light proof casing provided with a film changing aperture, a guideway for temporarily supporting said casing, means for supporting said drum so that it may turn clear of said casing, and automatic means effective to stop the rotary movement of said drum at a predetermined angular position.

13. In a device for changing film on a detachable scanning drum while enclosed in a light proof casing provided with a film changing aperture, a guideway for temporarily supporting said casing, means for supporting said drum so that it may turn clear of said casing, means for attaching said drum to said supporting means in a predetermined angular position, and automatic means effective to stop the rotary movement of said drum at a predetermined angular position.

14. In a device for changing film on a detachable scanning drum while enclosed in a light proof casing provided with a film changing aperture, a guideway for temporarily supporting said casing, means for supporting said drum so that it may turn clear of said casing, means on said drum for securing a sheet of film thereto, means for attaching said drum to said supporting means in a predetermined angular position, and automatic means effective to stop the rotary movement of said drum with the film securing means aligned with the film changing aperture in the casing.

15. In a device for changing film on a detachable scanning drum while enclosed in a light proof casing provided with a film changing aperture, a guideway for temporarily supporting said casing, means comprising a head stock and a tail stock for supporting said drum so that it may turn clear of said casing, means on said drum for securing a sheet of film thereto, means for attaching said drum to said head stock in a predetermined angular position, and automatic means effective through said head stock for stopping the rotary movement of said drum with the film securing means aligned with the film changing aperture in the casing, and manually operated means for releasing said drum from said automatic stopping means.

HAROLD CARLSON.